United States Patent
Hamada et al.

(10) Patent No.: US 6,833,972 B2
(45) Date of Patent: Dec. 21, 2004

(54) METHOD FOR REPRODUCING PHASE INFORMATION SIGNALS IN AN INFORMATION RECORDING DEVICE

(75) Inventors: Taizou Hamada, Osaka (JP); Yasuaki Ban, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 10/277,983

(22) Filed: Oct. 23, 2002

(65) Prior Publication Data

US 2003/0081345 A1 May 1, 2003

(30) Foreign Application Priority Data

Oct. 26, 2001 (JP) ..................................... P2001-329526

(51) Int. Cl.[7] .............................................. G11B 5/596
(52) U.S. Cl. ..................................... 360/77.08; 360/75
(58) Field of Search .............................. 360/48, 49, 51, 360/77.08, 75, 77.02, 77.04

(56) References Cited

U.S. PATENT DOCUMENTS 6,061,200 A * 5/2000 Shepherd et al. ........ 360/77.04
6,515,812 B1 * 2/2003 Bergmans et al. ............ 360/48

FOREIGN PATENT DOCUMENTS

JP          10-83640        3/1998
JP         11-144218        5/1999

* cited by examiner

*Primary Examiner*—Sinh Tran
*Assistant Examiner*—Jason Olson
(74) *Attorney, Agent, or Firm*—McDermott Will & Emery LLP

(57) ABSTRACT

The data row $Pw(i)$ of phase information obtained by reading preformatted phase patterns on an information recording medium by the head consists of the remainders obtained by dividing the data row of the phase information indicating the original track location by $2\pi$. The data row $Pw(i)$ in a convoluted state is entered; a data row $dPw(i)$ consisting of the differential values between adjacent data in the data row $Pw(i)$ is generated; a two-step differential data row $\delta Pw(i)$ consisting of the differential values between adjacent data in the data row $dPw(i)$ is generated; the cumulative coefficient $k(i)$ is adjusted according to the section region where the value of the two-step differential data row $\delta Pw(i)$ belongs; a differential data row $dPu(i)$ ($=\delta Pw(i)+2\pi \times k(i)$) is generated by applying a reconstructing process for solving the convolution process with the use of the found cumulative coefficient $k(i)$; and a reconstructed phase information data row $Pu(i)$ is obtained by further applying integration.

5 Claims, 16 Drawing Sheets

FIG. 3A phase signal waveform to be reconstructed
FIG. 3B measured phase signal waveform
FIG. 3C differential phase signal waveform
FIG. 3D differential phase signal waveform subjected to a reconstructing process
FIG. 3E integrated phase signal waveform measured phase
signal waveform phase signal waveform
to be reconstructed

METHOD FOR REPRODUCING PHASE INFORMATION SIGNALS IN AN INFORMATION RECORDING DEVICE

BACKGROUND OF THE INVENTION

1. Field of the Invention

The present invention relates to a method for reproducing phase information signals which reconstruct original phase information data rows, based on the convoluted phase information data rows which are read by the head from information recording media in an information recording device.

2. Description of the Related Art

The current trend of magnetic recording and reproducing devices is moving toward greater recording densities in order to achieve miniaturization and high capacity. In the field of hard disk drives which are a typical magnetic recording and reproducing device, those with a surface recording density over 15 Gbits/in$^2$ (23.3 Mbits/mm$^2$) have been already on the market, and those with a surface recording density of 40 Gbits/in$^2$ (62.0 Mbits/mm$^2$) have been in rapid technical progress toward the actual practice. It is expected that track pitches will reach the level of submicron in the near future.

For such a narrow track, tracking servo technique of the head is important. In the current magnetic recording and reproducing devices, preformatted information signals such as tracking servo signals, address information signals, and reproduction clock signals are recorded on disk-shaped information recording media at fixed angle intervals. The head reproduces these signals at fixed intervals and accurately scans the target track, while pinpointing and modifying its location.

One of such tracking servo techniques is a phase servo control which employs the time information of regenerative signal pulses, that is, phase information as the location information of the head (refer to Japanese Laid-open Patent Application No. 10-83640 (Page 5, FIG. 6), Japanese Laid-open Patent Application No. 11-144218 (Pages 8–10, FIG. 7), for example).

When an information recording medium thus preformatted is installed in an information recording device, the phase patterns written in the information recording medium might be decentered with respect to the rotation center of the information recording medium. In this case, even when the head is at a standstill, the phase signals as the location information of the head picked up by the head are not constant, but fluctuate in the form of sine wave. This makes it impossible to perform proper tracking control.

SUMMARY OF THE INVENTION

It is necessary to compensate the influence of the decentered phase patterns in the information recording medium on the relative physical relation between the rotation center and the head.

Therefore, the main object of the present invention is to perform high precision compensation for decentering, even if the amount of decentering of the phase patterns is large in contrast to the track density.

Other objects, features, and advantages of the present invention will be clarified in the description below.

In order to achieve the above object, the present invention adopts the following approach to reproduce phase information signals in an information recording device.

An information recording medium previously stores phase patterns for track location detection. The phase patterns are repetition patterns in the direction of the radius of the medium, and this repetition of phase patterns is the cause of data convolution.

In a first step, phase patterns on the information recording medium are read by the head to acquire the data row of phase information. The data row of the phase information is a convoluted data row, which consists of the remainders obtained by dividing each data in the phase information data row to be reconstructed by a predetermined value ($2\pi$, for example).

In a second step, a differential data row is generated which is a data row of the differential values between adjacent data in the data row of the convoluted phase information read by the head. In a third step, a two-step differential data row is generated which is a data row of the differential values between adjacent data in the differential data row. In a fourth step, in the two-step differential data row, after cumulative coefficient is calculated depending on the section region to which each data belong, a reconstructing process is performed to solve the convolution process, thereby generating a reconstructed differential data row. Finally, in a fifth step an integrating process is applied to the reconstructed differential data row, thereby acquiring the reconstructed phase information data row.

The above configuration can be expressed as follows with symbols so as to make it easier to understand.

Suppose the data row of the convoluted phase information read in the first step is Pw(i) (i=1, 2, ... N). Letting the phase information data row to be reconstructed in the end is Pu(i), the cumulative coefficient is k(i), and the predetermined value of convolution is $\alpha$, the following equation can be obtained:

$$Pu(i)=Pw(i)+\alpha k(i) \quad (1)$$

Convolution is accompanied by repetition. The repetition period is generally typified by $2\pi$. Letting $\alpha=2\pi$, $$Pu(i)=Pw(i)+2\pi \times k(i) \quad (2)$$

Supposing the differential data row to be generated in the second step is dPw(i), $$dPw(i)=Pw(i)-Pw(i-1) \quad (3)$$

Supposing the two-step differential data row to be generated in the third step is $\delta$Pw(i), $$\delta Pw(i)=dPw(i)-dPw(i-1) \quad (4)$$

In the fourth step, it is determined which section region each data of the two-step differential data row $\delta$Pw(i) belong to, thereby controlling the cumulative coefficient k(i) depending on the section region where each data belong. For example, when the data belongs to the first section region, it is decremented, when it belongs to the second section region, it is kept in the current value, and when it belongs to the third section region, it is incremented. Then, a reconstructing process is performed to solve the convolution process by using the found cumulative coefficient k(i). Supposing the reconstructed differential data row obtained here is dPu(i), $$dPu(i)=\delta Pw(i)+2\pi \times k(i) \quad (5)$$

In the fifth and final step, a reconstructed differential data row dPu(i) is integrated to obtain a reconstructed phase information data row Pu(i). Supposing the integration constant is γ, $$Pu(i) = \Sigma dPu(i) + \gamma \quad (6)$$

As explained above, the section regions are discriminated by using the two-step differential data row δPw(i); the differential data row dPu (i) is reconstructed by finding the cumulative coefficient k(i); and the phase information data row Pu(i) is reconstructed by integration. Therefore, even if the amount of decentering of the phase patterns on the information recording medium is large, it is possible to accurately reconstruct the phase signal waveform indicating the original track location from the phase signal waveform measured in a convoluted state.

The use of the results achieves the accurate detection of the relationship between the amount of decentering and the phase. Consequently, a high precision tracking control can be realized by performing the tracking control of the head, while compensating decentering with the use of the relation.

In the above explanation, the boundary values for the section regions can be in the mode of "−π" and "π". As another mode, the boundary values can be "−3π", "−π" "π", and "3π". The former mode might cause singularities where the reconstructed phase signal waveform loses smoothness in parts, whereas the latter mode can suppress the occurrence of such singularities, and reconstruct the phase signal waveform indicating the track location with high precision.

In the integrating process in the fifth step, it is preferable to apply numerical integration to the data row obtained by using the mean value Ea of the reconstructed differential data row dPu(i) and by subtracting the mean value Ea from the reconstructed differential data row dPu(i).

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE PREFERRED EMBODIMENTS

The embodiments of the method for reproducing phase information signals in the information recording device of the present invention will be described in detail as follows.
(Embodiment 1)

Figure 4:
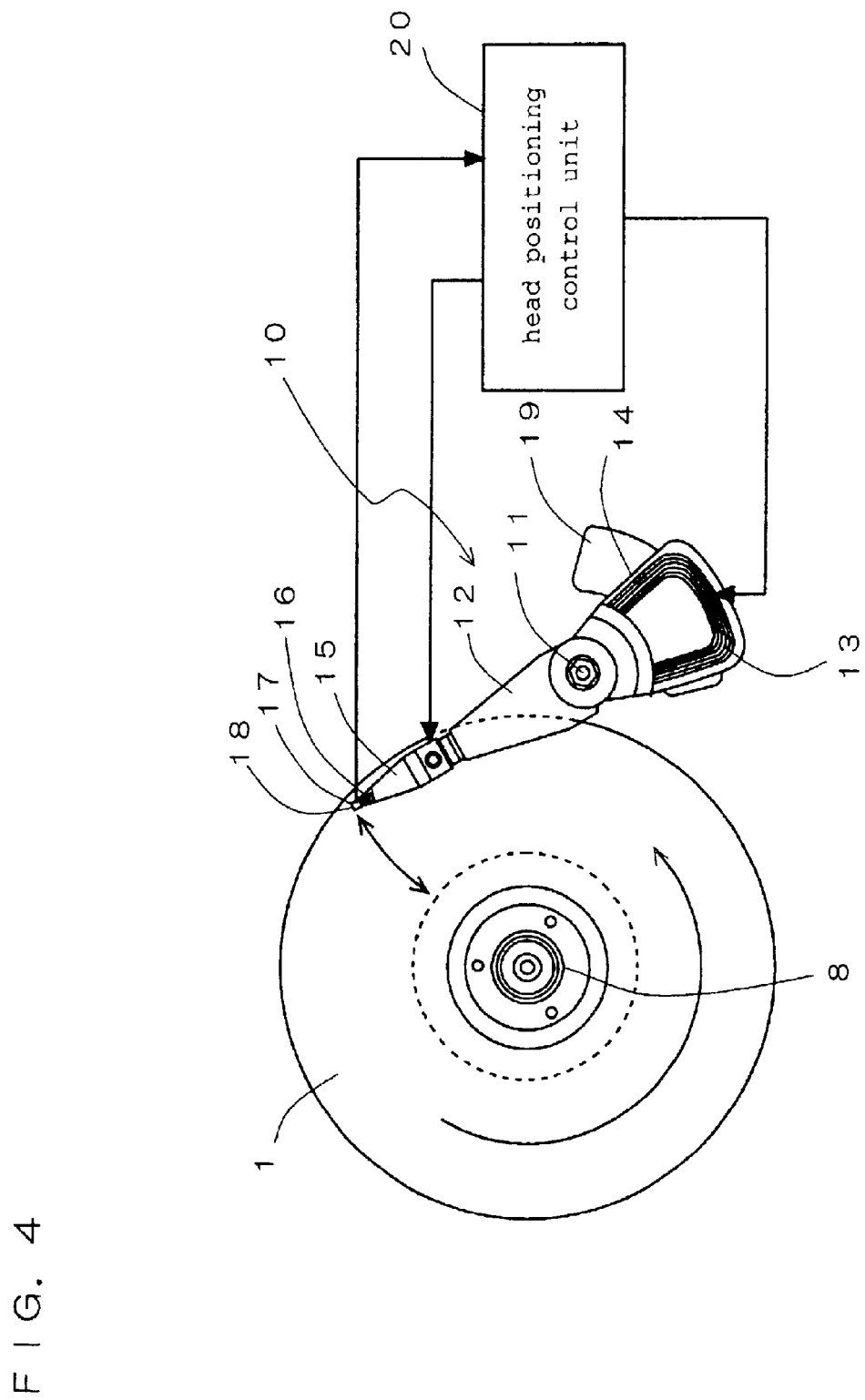
FIG. 4 is a plan view showing the general structure of the information recording device to which the method for reproducing the phase information signals according to the embodiments of the present invention is applied.
Figure 5:
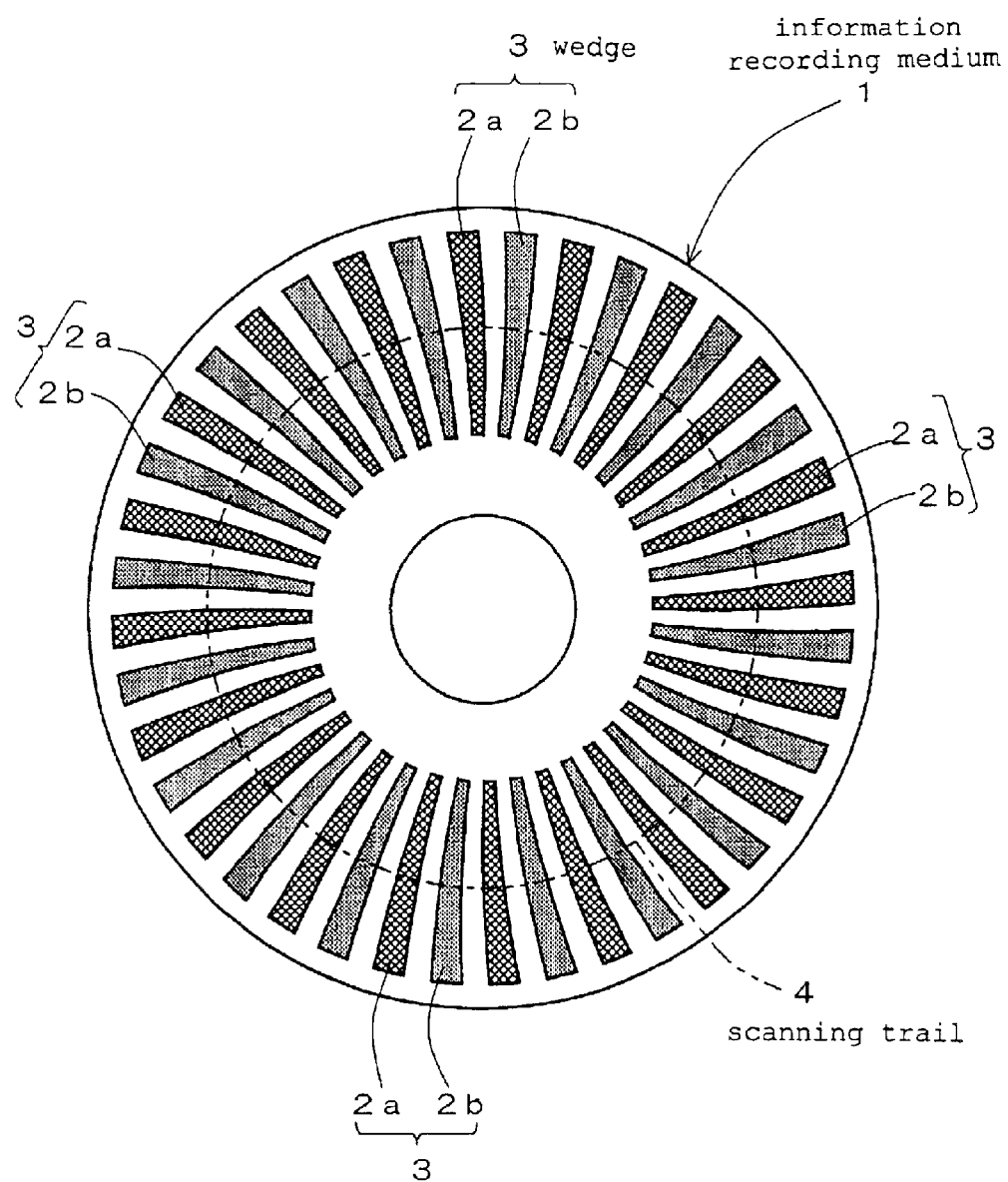
FIG. 5 is a plan view explaining the disk-shaped information recording medium in which preformatted information signals are written as an example of the application of the present invention.

FIG. 5 is a schematic diagram of the pattern drawn on the information recording medium 1 such as a magnetic disk in order to apply a phase servo control. The information recording surface of the disk-shaped information recording medium 1 includes the first regions 2a and the second regions 2b on which phase patterns are written for the detection of a track location. The phase pattern of the first regions 2a and the phase pattern of the second regions 2b are distinguished from each other. A pair of a first region 2a and a second region 2b forms one wedge 3. A number of such wedges 3 are arranged at the same intervals in the circumferential direction around the center of the information recording medium 1. The reference number 4 indicates one of the trails of the head for the recording/reproducing (Refer to the head 18 shown in FIG. 4) to scan the information recording medium 1.

Figure 6:
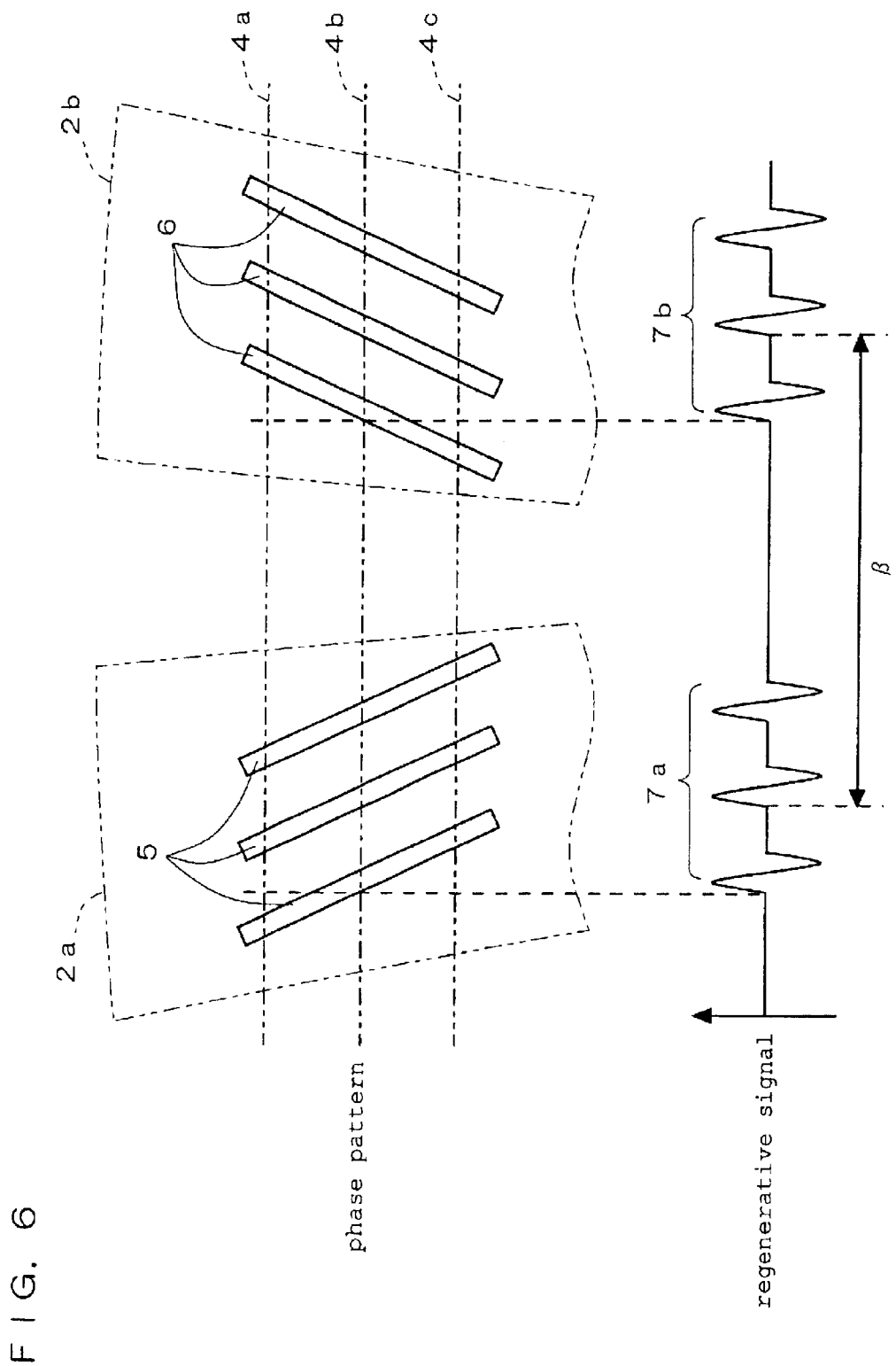
FIG. 6 is a schematic view showing the phase patterns drawn on a disk-shaped information recording medium in order to apply the phase servo control.

FIG. 6 specifically shows two kinds of phase patterns. In FIG. 6 the first phase pattern 5 is recorded on the first regions 2a and the second phase pattern 6 is recorded on the second regions 2b. The first phase pattern 5 and the second phase pattern 6 are not parallel to the direction of the radius of the information recording medium 1, but are sloped with the predetermined angle. The first and second phase patterns 5 and 6 are sloped in the opposite directions to each other. In the case where the information recording medium 1 is a magnetic disk, the magnetic phase patterns shown in FIG. 6 can be easily obtained by being transferred onto a magnetic disk with the use of a master information carrier having the array patterns of a ferromagnet thin film corresponding to the phase patterns.

In FIG. 5 as the result of the head forming the scanning trail 4, the first regenerative signal waveform 7a corresponding to the first phase pattern 5 and the second regenerative signal waveform 7b corresponding to the second phase pattern 6 are obtained. Both the first regenerative signal waveform 7a and the second regenerative signal waveform 7b are generated in plural numbers and the pulse is repeated to make the wave detectable.

When the scanning trail 4 of the head makes a change in the radial direction, the first regenerative signal waveform 7a and the second regenerative signal waveform 7b change their phases in the direction of the time axis. For example, the phases of these regenerative signals 7a, 7b while the head is forming the scanning trail 4b in the center of FIG. 6 are as shown in the drawing. When the head forms the scanning trail 4a outside the radial direction, the phase of the first regenerative signal waveform 7a leads (shift to the left side) and the phase of the second regenerative signal waveform 7b lags (shift to the right side). As a result, the pulse interval β between these regenerative signal waveforms 7a, 7b increases. On the contrary, when the head forms the scanning trail 4c inside the radial direction, the phase of the first regenerative signal waveform 7a lags (shift to the right side), and the phase of the second regenerative signal waveform 7b leads (shift to the left side). As a result, the pulse interval β decreases.

With a change in the location of the head in the direction of the radius of the information recording medium 1, the regenerative signal waveforms 7a, 7b change their phases, thereby changing the pulse interval β. The amount of off-track of the head can be detected based on this.

Prior to the description of the specific technical contents of the first embodiment of the present invention, the basic technique will be described with reference to FIGS. 9 and 10 so as to make the invention understood easier.

Basic technique in the procedure for finding the phase corresponding to the location of the head for each wedge 3 shown in FIG. 5 will be described by the flowchart of FIG. 9.

In Step S61 the signal sequence V(i) of the regenerative signal corresponding to the wedge number i is entered; in Step S62 the signal sequence of the first regenerative signal waveform 7a corresponding to the first phase pattern 5 is detected based on the entered signal sequence V(i); in Step S63 phase demodulation is applied to the first regenerative signal waveform 7a; and in Step S64 the phase value sequence φa(i) corresponding to the first regenerative signal waveform 7a is acquired. On the other hand, in Step S65 the signal sequence of the second regenerative signal waveform 7b corresponding to the second phase pattern 6 is detected based on the entered signal sequence V(i); in Step S66 phase demodulation is applied to the second regenerative signal waveform 7b; and in Step S67 the phase value sequence φb(i) corresponding to the second regenerative signal waveform 7b is acquired. In Step S68, the differential of the two phase value sequences φa(i) and φb(i) is calculated to find the phase value sequence φ(i) in the wedge number i as follows:

$$\phi(i)=\phi a(i)-\phi b(i) \qquad (7)$$

This phase value sequence φ(i) corresponds to the pulse interval β shown in FIG. 6. The amount of off-track of the head is detected based on the phase value sequence φ(i), and the track following is automatically controlled based on it.

Figure 9:
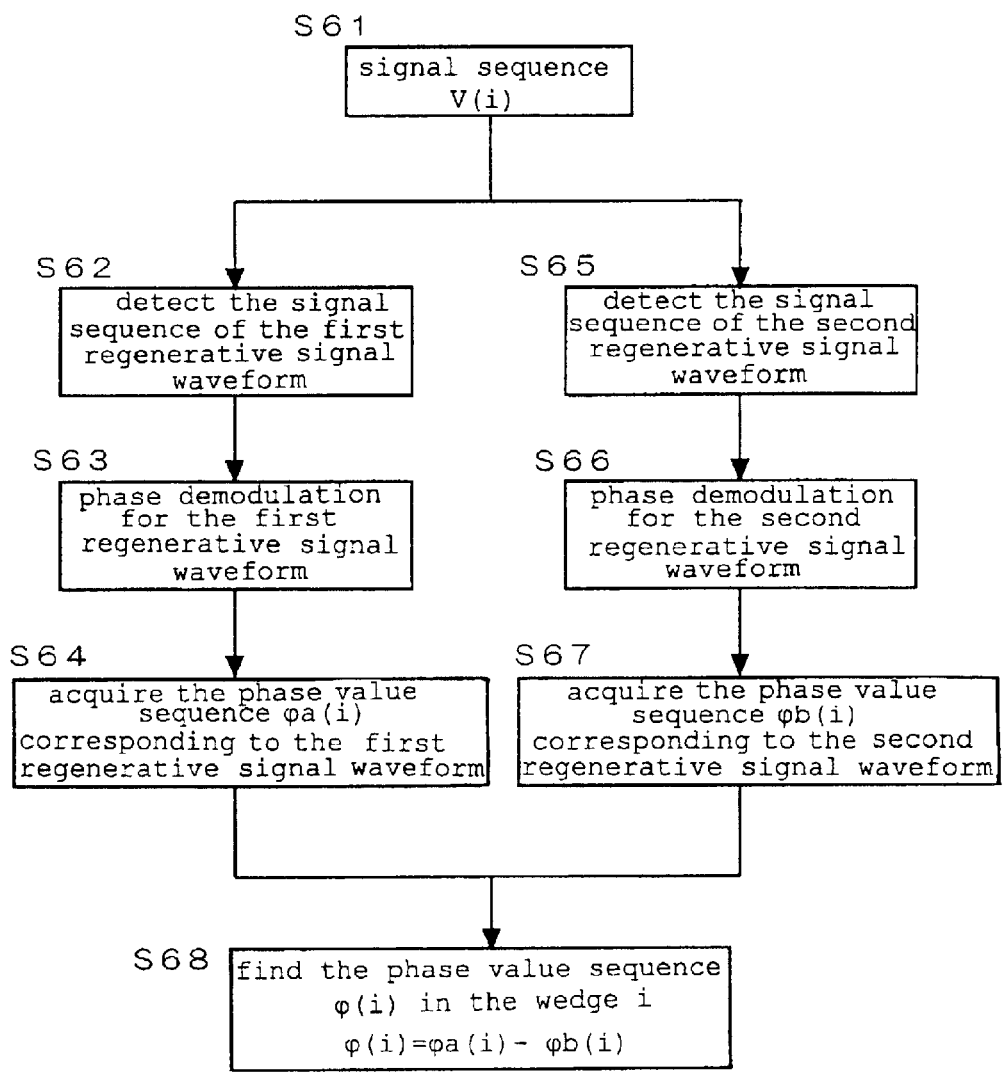
FIG. 9 is a flowchart depicting the process of demodulating the phase information signals.

Although the phase value sequence φ(i) as the differential of FIG. 9 corresponds to β of FIG. 6, the tracking control can be done by using either one of the phase value sequences φa(i) or φb(i) instead of using the phase value sequence φ(i) as differential. Using the phase value sequence φ(i) as the differential doubles the sensitivity.

In a hard disk device using the phase serve technique, phase patterns are already written in the magnetic disk before the magnetic disk is installed to the hard disk device.

When the preformatted information recording medium is installed to the information recording device, the phase patterns written in the information recording medium may be decentered from the rotation center of the information recording medium. Even when the head is at a standstill in the radial direction from the rotation center of the motor, the presence of decentering will prevent the phase signals which are the information about the track location from being kept constant and make them fluctuate in the form of sine wave.

Recent information recording media are having larger and larger track densities, and the amount of fluctuation in phase signals due to decentering grows with the increase in track density under the same amount of decentering. On the other hand, in the case where the track density is the same, the amount of fluctuation in phase signals increases with increasing amount of decentering.

The occurrence of fluctuation in phase signals due to decentering makes it impossible to perform a proper tracking control. To solve this problem, it is necessary to compensate a fluctuation in phase value sequence φ(i) resulting from the decentering of phase patterns. The following approach is available for that.

The amount of fluctuation in phase pattern due to decentering is measured in advance to designate the relation between the amount of fluctuation and the amount of decentering. For this, an information recording medium is installed to the information recording device, and then the head is mechanically fixed to find the phase value sequence.

Figure 10B:
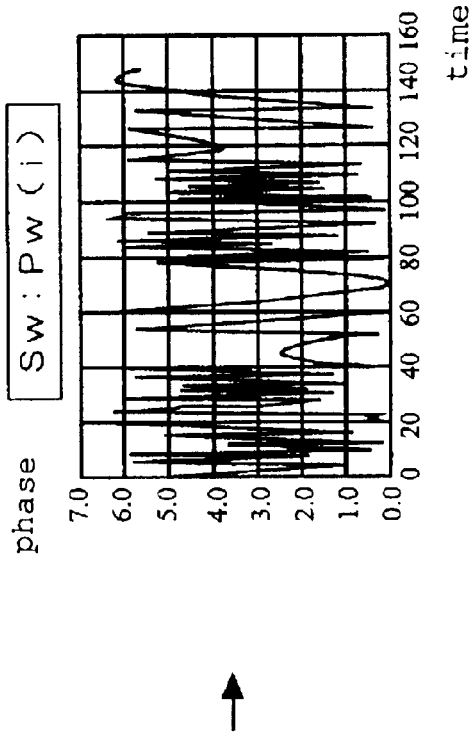
FIG. 10B is the waveform of the convoluted phase signals.
Figure 10A:
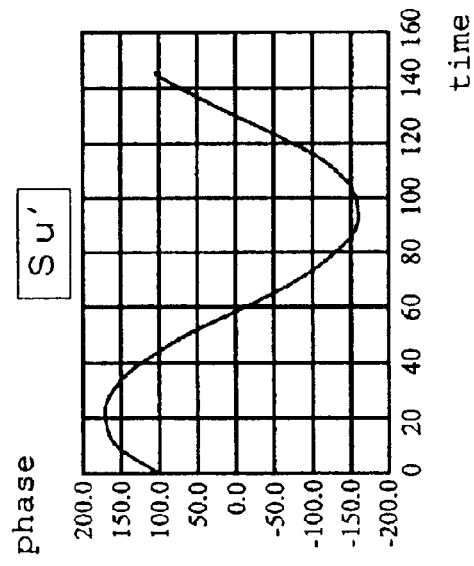
FIG. 10A is the waveform of the phase signals to be reconstructed.

FIG. 10A shows that the phase signal waveform Su' to be reconstructed is fluctuating in the form of sine wave due to decentering. When the fluctuation is at rest, the phase signal waveform Su' to be reconstructed is supposed to be kept constant if there is no decentering. However, it fluctuates in the form of sine wave because of decentering. FIG. 10B shows the phase signal waveform Sw regenerated by the head from the information recording medium. Because of the characteristics of the phase pattern shown in FIG. 6, the phase signal waveform regenerated by the head becomes Sw shown in FIG. 10B, making it impossible to detect Su' directly. However, what is needed in compensation for decentering is the phase signal waveform Su' shown in FIG. 10A. Therefore, the original phase signal waveform Su' is reconstructed from the detected phase signal waveform Sw. Proper reconstruction of the phase signal waveform Su' could perform accurate compensation for decentering.

The measured phase signal waveform Sw corresponds to the phase signal waveform Su' to be reconstructed in a convoluted state. The sequence of the remainder values obtained by dividing each value in the data array of the phase signal waveform Su' by 2π is the convoluted phase signal waveform 2w that is actually obtained by measurement.

Figure 7:
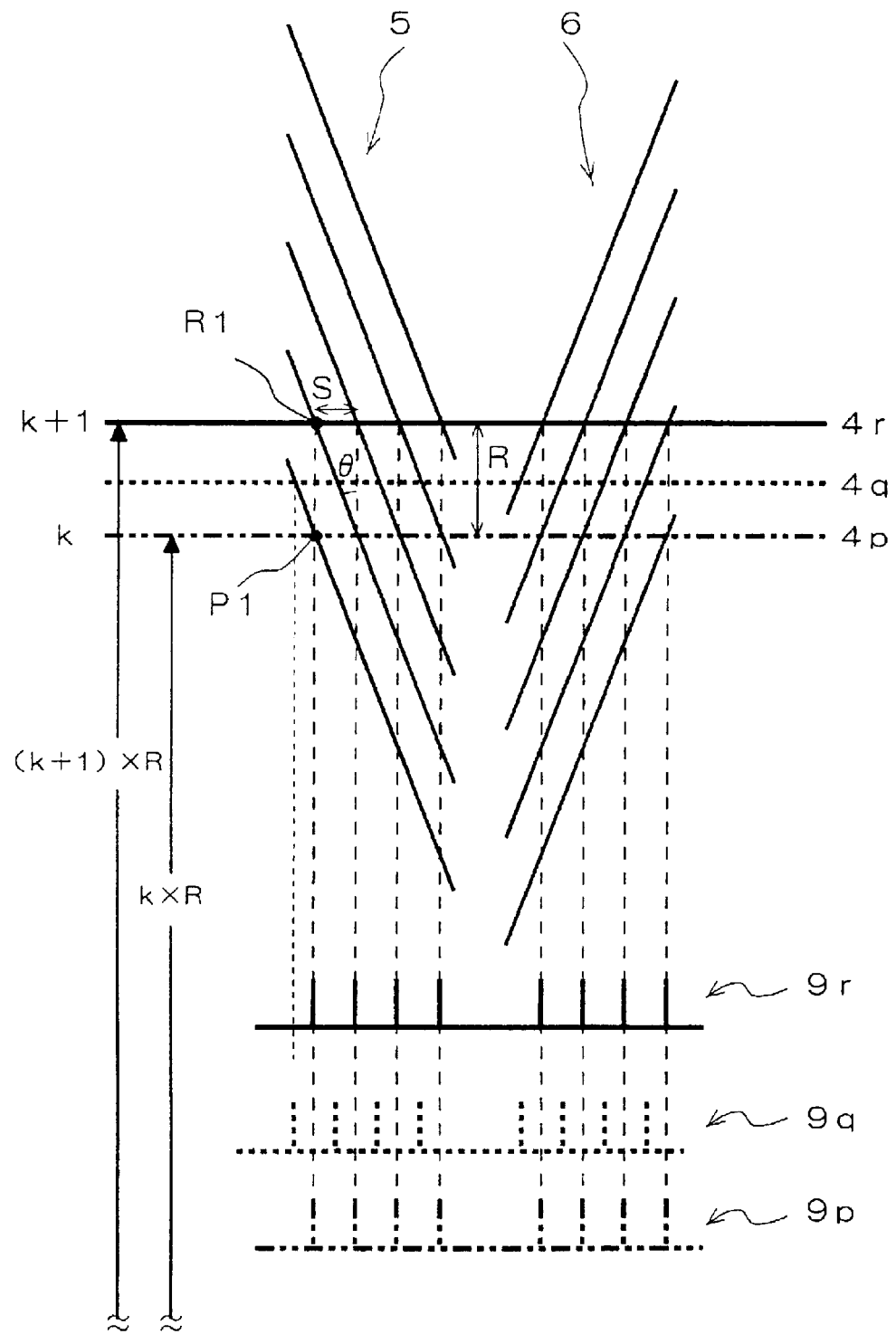
FIG. 7 is a detailed view showing that the phase patterns of FIG. 6 are repetitive.

The following is a supplementary explanation about convolution. The phase patterns 5 and 6 shown in FIG. 6 are repetitive patterns in the direction of the radius of the information recording medium 1. Its detail is shown in FIG. 7. The phase pattern 9p of the regenerative signals 7a, 7b when the head passes through the scanning trail 4p is the same as the phase pattern 9r of the regenerative signals 7a, 7b when the head passes through the scanning trail 4r. This is because the location of a point of intersection (point P1, for example) of the scanning trail 4p and the phase patterns 5, 6 in the circumferential direction is the same as the location of a point of intersection (point R1, for example) of the scanning track 4r and the phase patterns 5, 6 in the circumferential direction. The phase pattern 9q of the regenerative signals 7a, 7b corresponding to the scanning trail 4q midway between the scanning trails 4p and 4r is located midway between the phase patterns 9p and 9r. In this manner, the phase patterns are repeated.

Suppose the pitch in the circumferential direction of the phase patterns 5 and 6 is S, and the tilt angle of the phase pattern 5 with respect to the radial direction is θ. Also supposing the pitch between regenerative signals having the same pattern in the radial direction is R, $$R = S/\tan \theta \tag{8}$$

The cumulative coefficient k is given to the positions delimited every pitch R in the radial direction from the standard position of the information recording medium 1. In this case, the k-th delimited position is k×R.

Figure 11:
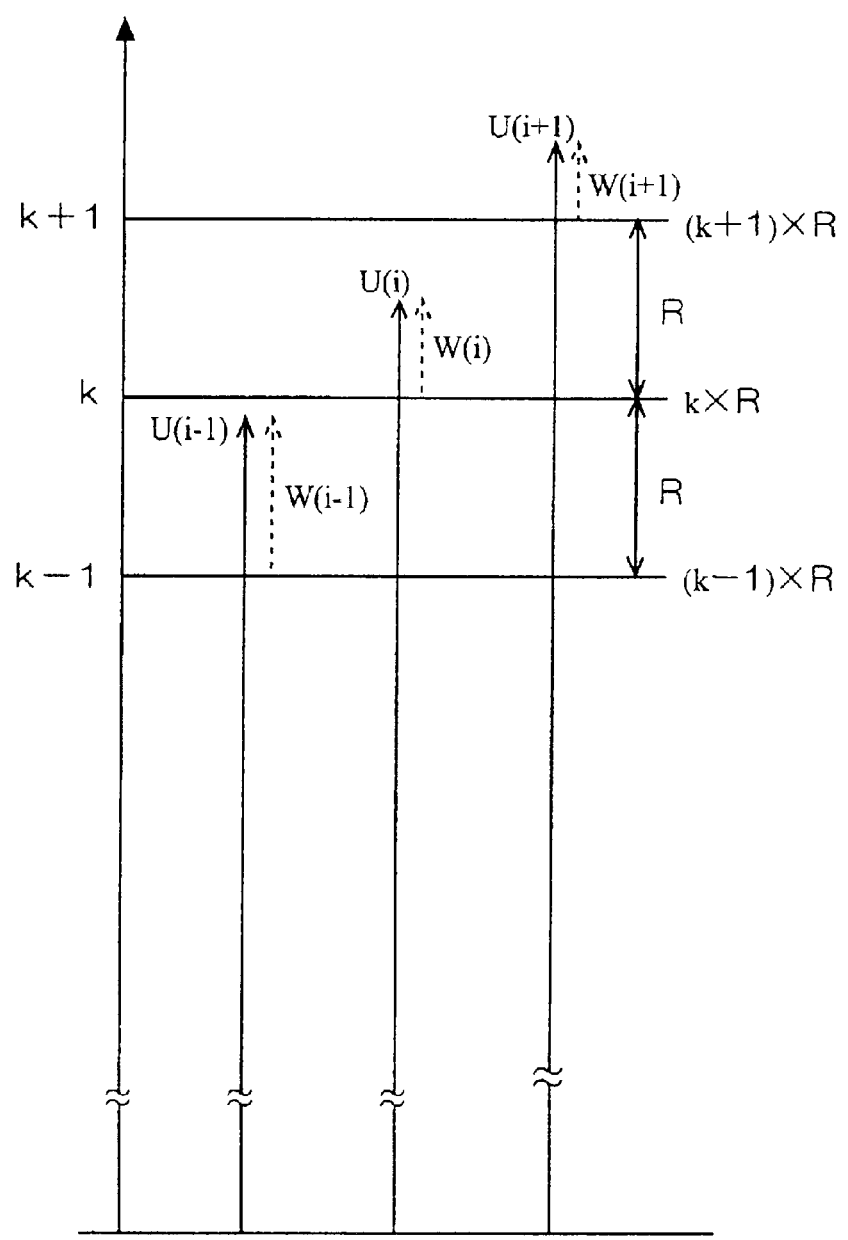
FIG. 11 is a view explaining the relation between the scanning trail location and the amount of displacement.

Suppose the scanning trail position between the k-th delimited position and the (k+1)-th delimited position is U(i), and the amount of displacement of the scanning trail position U(i) from the k-th delimited position towards outside in the radial direction is W(i) as shown in FIG. 11:

$$U(i) = k \times R + W(i) \tag{9}$$

In the same manner, suppose:

$$U(i-1) = (k-1) \times R + W(i-1) \tag{10}$$

$$U(i+1) = (k+1) \times R + W(i+1) \tag{11}$$

What are detected by the head are W(i−1), W(i), and W(i+1). The actual scanning trail position U (i−1) is calculated by the detected value W(i−1), and the scanning trail positions U(i) and U(i+1) are found from the detected values W(i) and W(i+1), respectively. W(i−1), W(i), and W(i+1) are in the range of not less than 0 and less than R.

Because of the presence of a repetition period, R is converted into 2π by being divided by R and multiplied by 2π. In other words, a replacement is done as follows:

$$2\pi = R \times 2\pi/R \tag{12}$$

$$Pu(i) = U(i) \times 2\pi/R \tag{13}$$

$$Pw(i) = W(i) \times 2\pi/R \tag{14}$$

Then, the above equations are changed as follows:

$$Pu(i-1) = 2\pi \times (k-1) + Pw(i-1) \tag{15}$$

$$Pu(i) = 2\pi \times k + Pw(i) \tag{16}$$

$$Pu(i+1) = 2\pi \times (k+1) + Pw(i+1) \tag{17}$$

Figure 12:
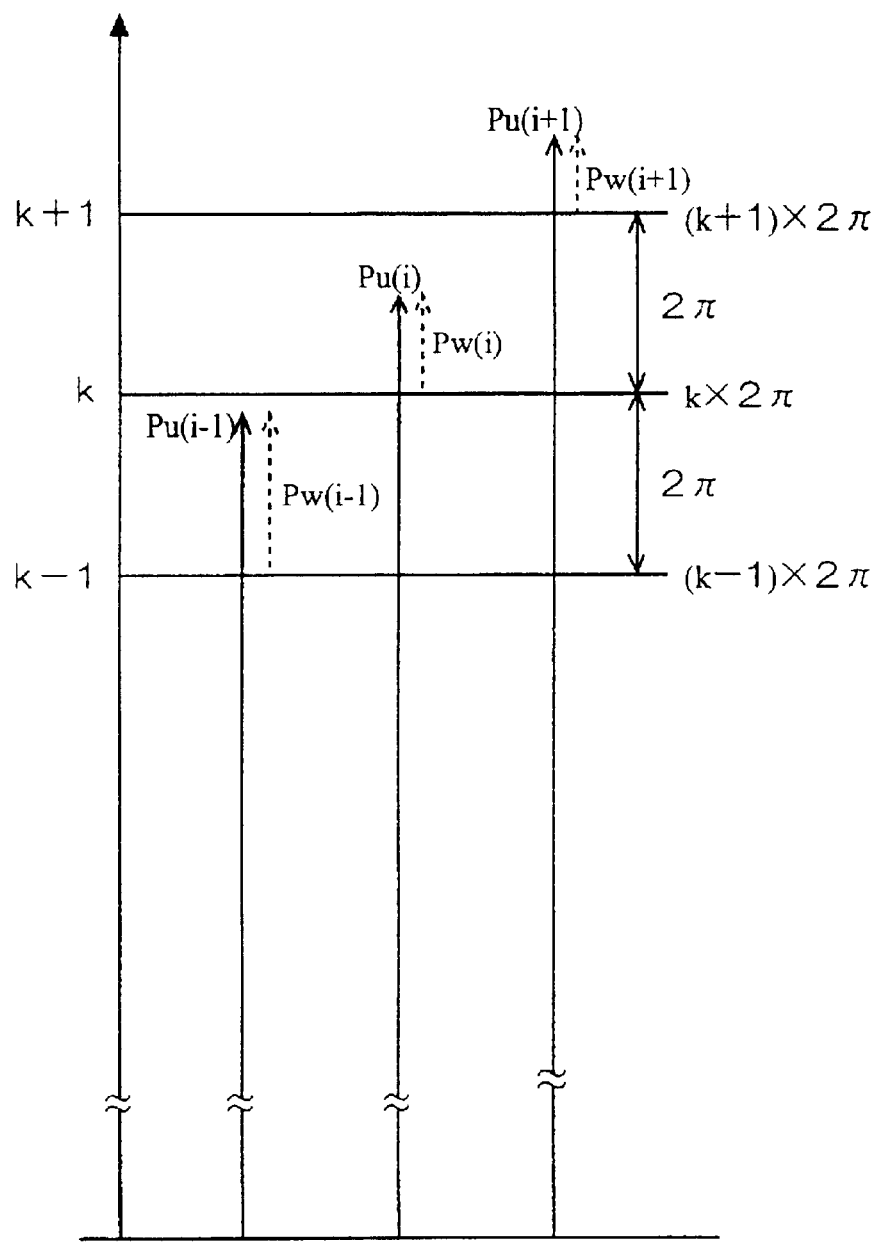
FIG. 12 is a converted view of FIG. 11.

FIG. 12 shows the details. Pw(i−1), Pw(i), Pw(i+1) are detected values, and are in the range of not less than 0 and less than 2π.

The measured phase signal waveform Sw shown in FIG. 10B is a combination of detected values Pw(i−1), Pw(i), Pw(i+1), and others.

The process for reconstructing the original smooth phase signal waveform Su' from the measured phase signal waveform Sw is also called "unwrap". In the present specification, "unwrap" is plainly referred to as "reconstruct". To be more specific, it indicates the operation shown in FIG. 13.

Pw(i) is the data array of the measured phase signal waveform Sw. Pu(i) is the data array of the phase signal waveform Su to be reconstructed.

Figure 13:
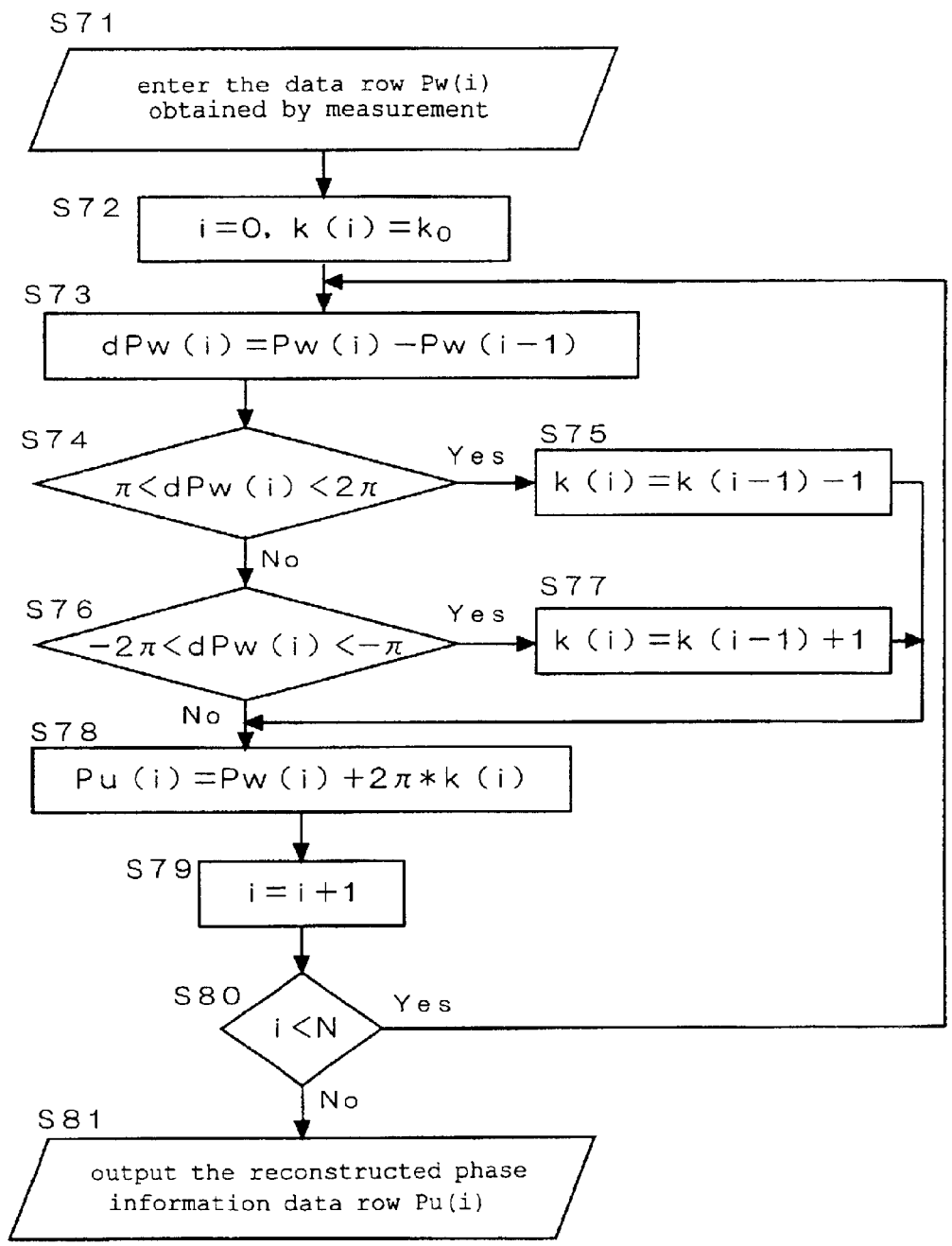
FIG. 13 is a flowchart depicting the procedure of the method for reconstructing the phase signals in the basic technique.

In Step S71 shown in FIG. 13 the convoluted data row Pw(i) found by measurement is entered. Suppose the number of wedges is N, and the variable i is prepared to count the wedges. The measured data row Pw(i) holds true to all the wedges, and is expressed from i=1 to i=N.

In Step S72 the variable i and the cumulative coefficient k(i) are initialized. The cumulative coefficient k(i) is a count rate to add or subtract the phase 2π by 2π, and its initial value is set at $k_0$. The cumulative coefficient k(i) is an integer (natural number).

In Step S73 a differential process is applied to adjacent phase data in the measured data row Pw(i), thereby generating a differential data row dpw(i). To be more specific, the calculation of:

$$dPw(i) = Pw(i) - Pw(i-1) \tag{18}$$

is carried out for all the wedges between the variable i=1 and i=N, thereby generating the differential data row dPw(i).

In Step S74 it is determined whether each data of the differential data row dPw(i) belong to the section region larger than "π". When it is determined that the value of the differential data row dpw(i) belongs to the section region larger than "π", the procedure goes to step S75 to decrement the cumulative coefficient k(i) by 1 (k(i)=k(i−1)−1), and then goes to Step S78.

When the determination in Step S74 turns out to be negative, the procedure goes to Step S76 where it is determined whether each data of the differential data row dPw(i) belong to the section region smaller than "−π". When it is determine that the value belongs to the section region smaller than "−π", the procedure goes to Step S77 where the cumulative coefficient k(i) is incremented by 1 (k(i)=k(i−1)+1) and goes to Step S78.

When each data of the differential data row dPw(i) belong to the section region of not less than "−π" and not more than "π", the procedure goes to Step S78 while keeping the cumulative coefficient k(i) at the value of k(i−1).

In Step S78, the value obtained by adding 2π×k(i) to the measured data row Pw(i) in a convoluted state, that is, process target, is made the reconstructed phase information data row Pu(i):

$$Pu(i) = Pw(i) + 2\pi \times k(i) \tag{19}$$

In Step S79 in order to process the next process target, the variable i is incremented. In Step S80 it is determined whether the value of the variable i after the increment has reached N or not, that is, whether there is a process target left or not. When it is left, the procedure goes back to Step S73 to apply the same process to the next target. When the process is done for all the measured data row Pw(i), the procedure goes to Step S81 to acquire the reconstructed phase information data row Pu(i) in the end.

According to the aforementioned operations, the phase information data row Pu(i) indicating the original track location can be reconstructed from the measured data row Pw(i).

FIGS. 14 and 15 show the operation of FIG. 13 to make it visually understandable.

Figure 14A:
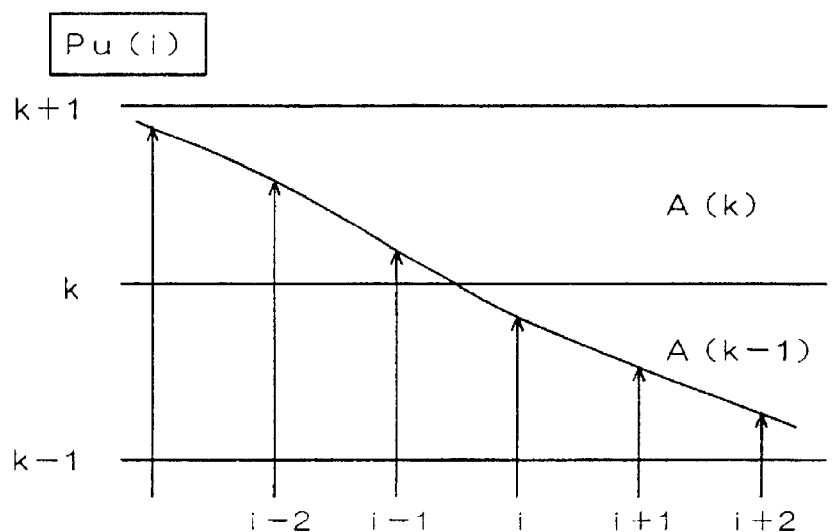
FIG. 14A is a view showing a gradual decrease in the phase information data row Pu(i) to be reconstructed.

FIG. 14 explains the case where the original phase information data row Pu(i) to be reconstructed decreases. Suppose the data row Pu(i) decreases with increasing wedge number i as shown in FIG. 14A. Also suppose the data row decreases from the k-th section region A(k) down to the (k−1)-th section region A(k−1) over the k-th delimited position.

Figure 14B:
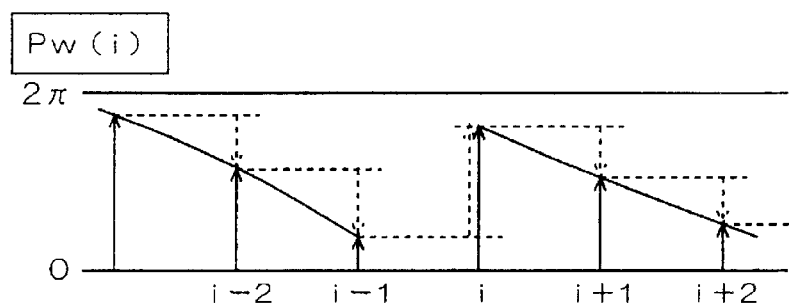
FIG. 14B is a view showing the measured data row Pw(i) corresponding to FIG. 14A.

FIG. 14B shows the measured data row Pw(i), which changes within the range of 0 to $2\pi$. The data row Pw(i) decreases with decreasing data row Pu(i); however, when the data row Pu(i) exceeds the delimited position k, the data row Pw(i) suddenly rises and then starts to decrease again. Thus, the data row Pu(i) and the data row Pw(i) are not in linear relation.

Figure 14C:
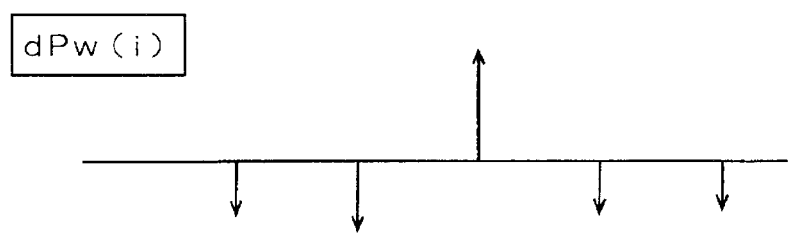
FIG. 14C is a view showing the differential data row dPw(i) corresponding to FIG. 14A.

FIG. 14C indicates the differential dPw(i)=Pw(i)−Pw(i−1) in the data row Pw(i). Since the data row Pu(i) decreases gradually, the differential dPw(i) basically has minus values; however, when it exceeds the delimited position k, it turns into a plus value. At that moment, as the general trend, the differential dPw(i) becomes larger than "$\pi$". As a rule, the differential dPw(i)=Pw(i)−Pw(i−1)>$\pi$ is equivalent to crossing the delimited position downwards. Hence it is necessary to decrement the cumulative coefficient k(i) as shown in Steps S74 to S75 in FIG. 13.

Figure 15A:
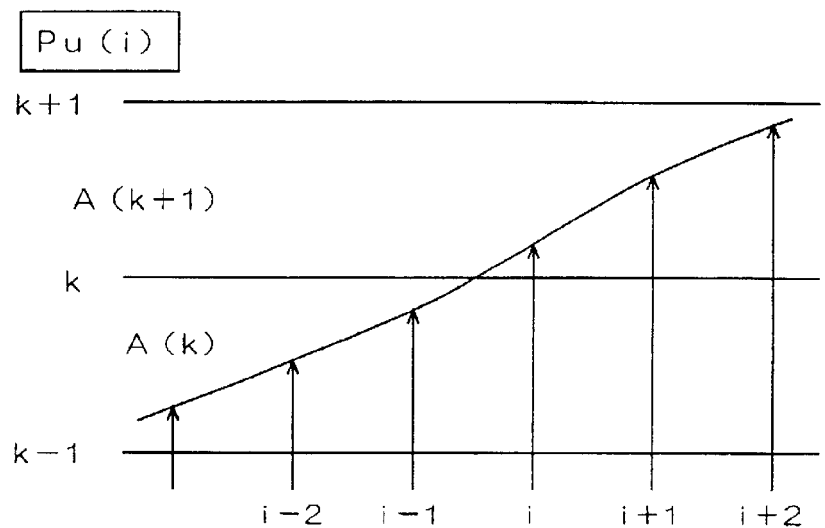
FIG. 15A is a view showing a gradual decrease in the phase information data row Pu(i) to be reconstructed.

FIG. 15 explains the case where the original phase information data row Pu(i) to be reconstructed increases. Suppose the data row Pu(i) gradually increases with increasing wedge number i as shown in FIG. 15A. Also suppose the data row has increased from the k-th section region A(k) to the (k+1)-th section region A(k+1) over the k-th delimited position.

Figure 15B:
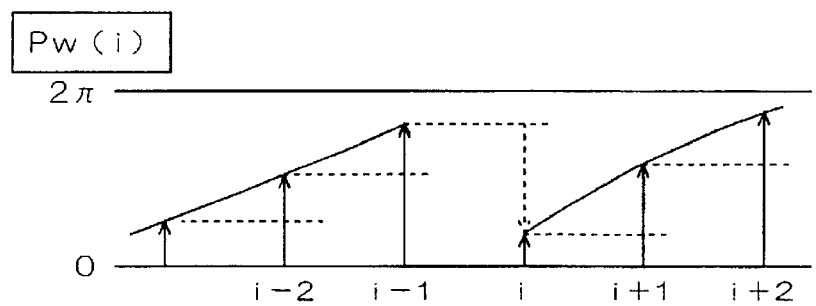
FIG. 15B is a view showing the measured data row Pw(i) corresponding to FIG. 15A.

The data row Pw(i) increases with increasing data row Pu(i) as shown in FIG. 15B; however, when the data row Pu(i) exceeds the delimited position k, the data row Pw(i) suddenly falls and then starts to increase again. In this case too, the data row Pu(i) and the data row Pw(i) are not in linear relation. Pw(i) changes in the range of 0 to $2\pi$.

Figure 15C:
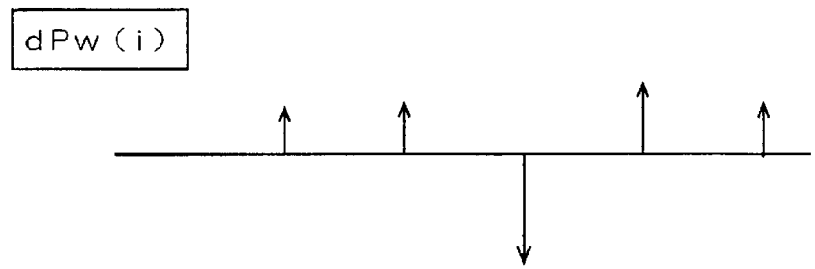
FIG. 15C is a view showing the differential data row dPw(i) corresponding to FIG. 15A.

Since the data row Pu(i) increases gradually as shown in FIG. 15C, the differential dPw(i)=Pw(i)−Pw(i−1) in the data row Pw(i) basically has plus values; however, when it exceeds the delimited position k, it turns into a minus value. At that moment, as the general trend, the differential dPw(i) becomes smaller than "−$\pi$" (the absolute value becomes larger). As a rule, the differential dPw(i)=Pw(i)−Pw(i−1)<−$\pi$ is equivalent to crossing the delimited position upwards. Hence it is necessary to increment the cumulative coefficient k(i) as shown in Steps S76 to S77 of FIG. 13.

The general procedure for phase reconstruction shown in FIG. 13 has the problem that phases cannot be properly reconstructed when the amount of decentering of phase patterns in contrast to the track density is relatively large and the phase signal waveform Su' to be reconstructed has a large amplitude. The reason for this is as follows. In the case where the amplitude is small, when a data row crosses over the delimited position from a certain section region A(k), it moves to the section region A(k+1) or A(k−1) which is higher or lower by one. On the other hand, when the amplitude is large, the data row may move to the section region A(k+2) or A(k−2) which is higher or lower by two. However, the process shown in FIG. 13 does not support it. With increasing amount of decentering, the cumulative coefficient k(i) is likely to be decentered in either direction of increment or decrement.

Figure 16A:
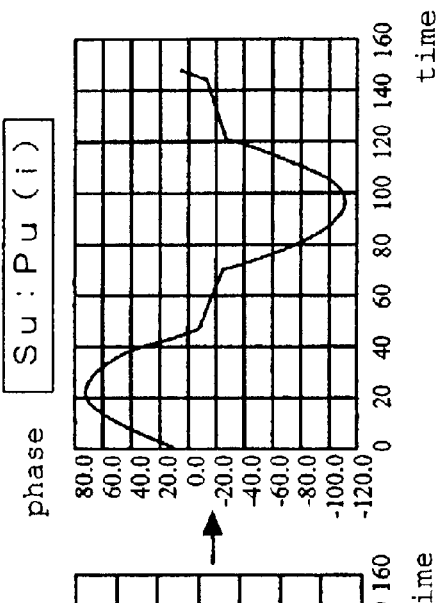
FIG. 16 is a waveform used to explain the operation in the method for reproducing phase information signals in the information recording device according to the basic technique.
Figure 16B:
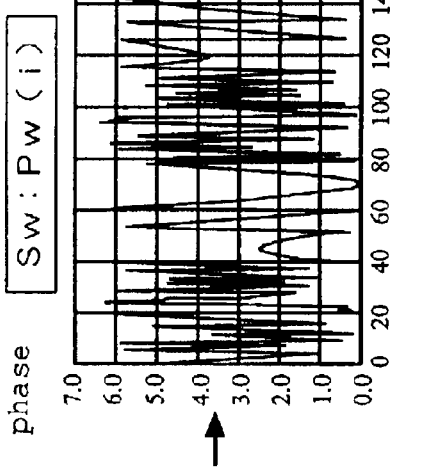
Figure 16C:
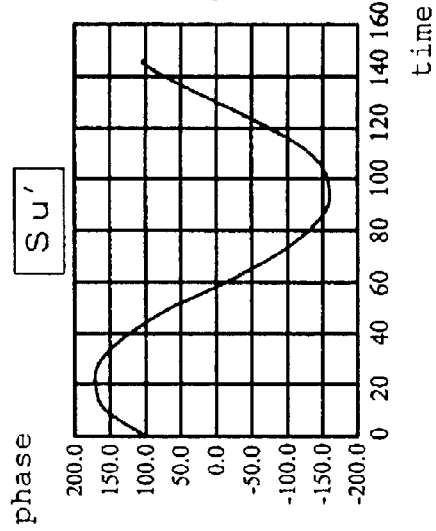

FIG. 16 shows the simulation results. FIG. 16A indicates the phase signal waveform Su' to be reconstructed which is in the form of sine wave and has the amplitude of 170 rad, and FIG. 16B shows the phase signal waveform Sw convoluted by $2\pi$, which is measured by the head. FIG. 16C shows the phase signal waveform Su reconstructed by the general procedure shown in FIG. 13. As shown in FIG. 16C, the reconstructed phase signal waveform Su is not smooth, and its amplitude is smaller than the phase signal waveform Su' to be reconstructed. Thus the reconstructing procedure of FIG. 13 fails to reconstruct the phase signal waveform Su' properly when the phase patterns have a large amount of decentering.

Therefore, it is important to properly reconstruct the original phase signal waveform from the measured phase signal waveform even if the amount of decentering is large. The first embodiment of the present invention which realizes this will be described as follows, based on FIGS. 1 to 4. FIGS. 5 through 7 and 9 are also referred to for the present embodiment.

FIG. 4 includes an information recording medium (magnetic disk) 1, a spindle motor 8 which rotates the information recording medium 1 around its axis at high speed, and a head actuator 10. The head actuator 10 comprises an actuator arm 12 supported by the rotation axis 11, a coil arm 14 which is connected with the actuator arm 12 and is located on the opposite side of the rotation axis 11, a coil 13 attached to the coil arm 14, a slider support beam 15 whose base end is attached to the free end side of the actuator arm 12, a micromotion actuator 16 which utilizes the thin film piezoelectric material attached on the free end side of the slider support beam 15, a slider 17 which is attached to the tip of the slider support beam 15 and its micro displacement is controlled by the micromotion actuator 16, and a recording/reproducing head 18 mounted on the slider 17. There are also a permanent magnet 19 attached on the case opposite to the coil 13, and a head position control unit 20.

The head positioning control unit 20 supplies the coil 13 with driving current so as to rotate the head actuator 10 around the rotation axis 11, thereby performing seek operation. The slider 17 at the tip of the head actuator 10 faces the information recording medium 1 rotating at high speed with a micro space therebetween. The head 18 reproduces preformatted information signals from the information recording medium 1 and transmits them to the head positioning control unit 20. The preformatted information signals to be reproduced include regenerative signals resulting from the phase patterns for tracking servo (refer to FIGS. 6 and 7). In the tracking following operation to position the head 18 with respect to the target track or in the tracking correction operation at the time of an off-track, the head positioning control unit 20 generates driving signals by performing predetermined calculations based on the regenerative signals for tracking servo and transmits the driving signals to the thin film piezoelectric element in the micromotion actuator 16. The micromotion actuator 16 is so operated that the head 18 is positioned to the target track with the slider 17.

FIG. 3A shows the phase signal waveform Su' to be reconstructed, and FIG. 3B shows the phase signal waveform Sw measured under the condition of being convoluted by $2\pi$. FIG. 3C shows the phase signal waveform Sdw obtained by applying the differential process of Step S12 in FIG. 1 to the measured phase signal waveform Sw; FIG. 3D shows the reconstructed differential phase signal waveform Sdu obtained by executing the phase reconstructing process of Step S13 shown in FIG. 1; and FIG. 3E shows the phase signal waveform Su obtained by executing the integrating process of Step S14 of FIG. 1.

The method for reproducing phase information signals in the information recording device of the present embodiment will be described as follows, based on the flowchart shown in FIGS. 1 and 2. The following operations are executed by the head positioning control unit 20.

In Step S11, the head 18 picks up preformatted information signals in the information recording medium 1 rotating at high speed and enters them to the head positioning control unit 20. The picked signals contain the convoluted data row Pw(i) corresponding to the phase signal waveform Sw. The data row Pw(i) holds true to all the wedges of i=1 to N.

In Step S12, a differential process is applied between adjacent phase data in the data row Pw(i) obtained by measurement, thereby generating the differential data row dPw(i). To be more specific, the calculation of:

$$dPw(i)=Pw(i)-Pw(i-1) \quad (20)$$

is applied to all the wedges from the variable i=1 to i=N, thereby generating the differential data row dPw(i).

In Step S13 a phase reconstructing process is applied to the differential data row dPw(i) so as to obtain a reconstructed differential data row dPu (i). FIG. 3C shows the phase signal waveform Sdw corresponding to the differential data row dPw(i).

The detailed operations in Step S13 will be described as follows, based on the flowchart shown in FIG. 2. The process shown in FIG. 2 is done in the same manner as the process shown in FIG. 3 except that the process target in FIG. 13 is the data row Pw(i), whereas the process target in FIG. 2 is the differential data row dPw(i).

Figure 2:
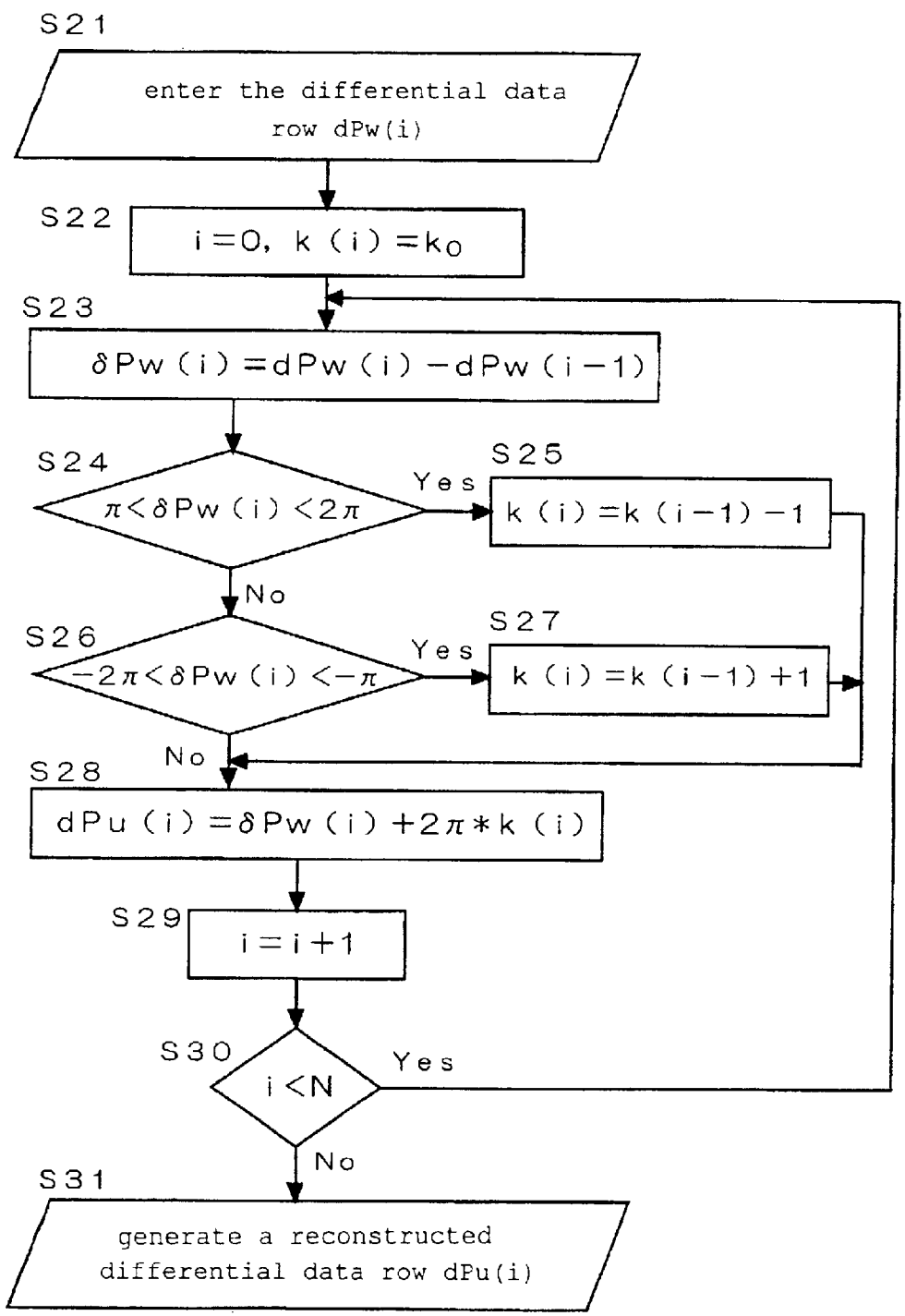
FIG. 2 is a flowchart depicting the detailed procedure of the phase reconstructing process in Embodiment 1 of the present invention.
Figure 3:
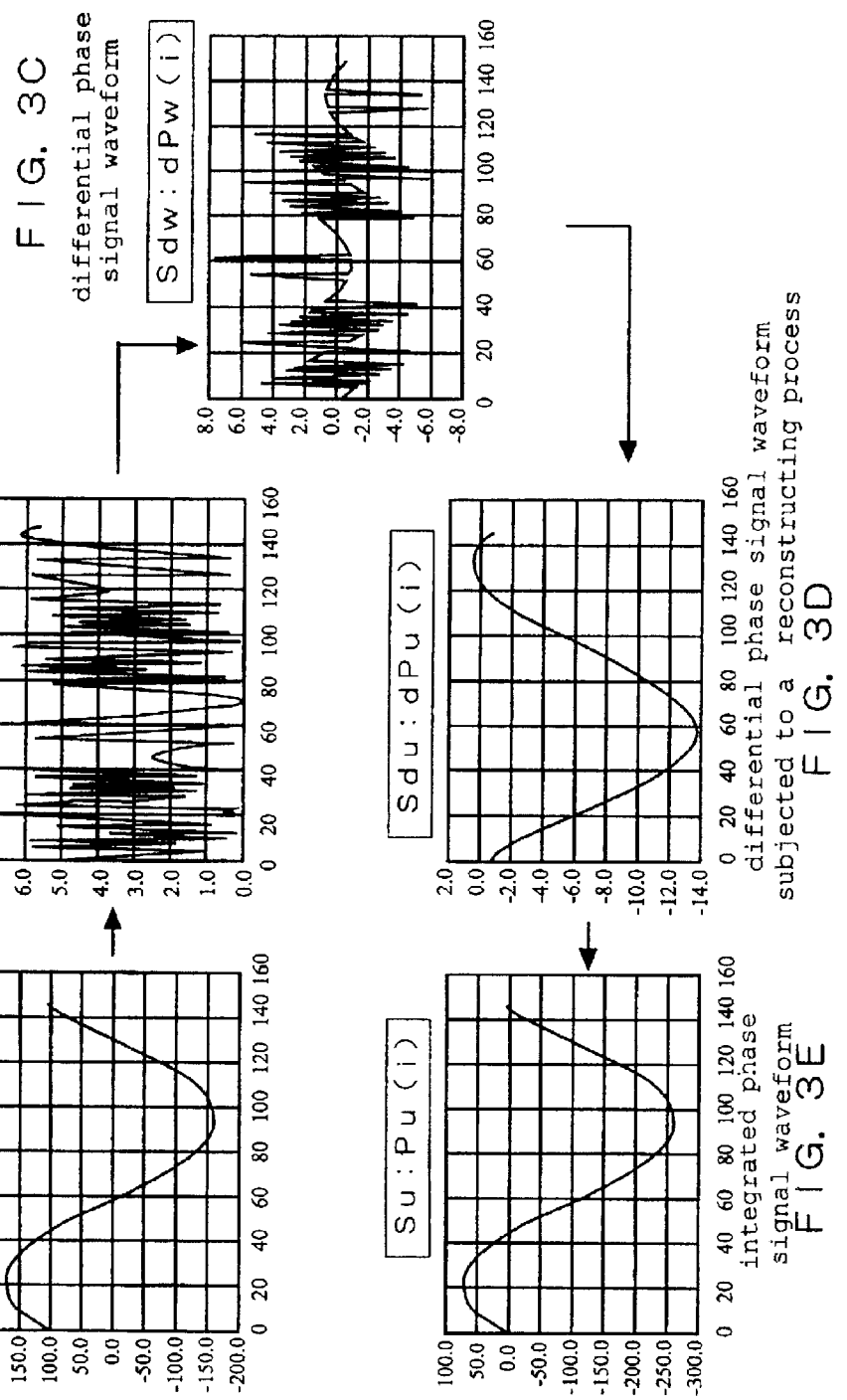
FIG. 3A is the waveform of the phase signals to be reconstructed in the reproducing method in Embodiment 1.
FIG. 3B is the waveform of measured phase signals in the reproducing method of Embodiment 1.
FIG. 3C is the waveform of differential phase signals in the reproducing method of Embodiment 1.
FIG. 3D is the waveform of differential phase signals subjected to a reconstructing process in the reproducing method of Embodiment 1.
FIG. 3E is the waveform of integrated phase signals in the reproducing method of Embodiment 1.

In Step S21 shown in FIG. 2 the differential data row dPw(i) is entered.

In Step S22 the variable i and the cumulative coefficient k(i) are initialized. The cumulative coefficient k(i) is a count rate to add or subtract the phase by $2\pi$, and its initial value is set at the appropriate value $k_0$ according to the requirements.

In Step S23 the differential δPw(i) is found between adjacent phase data in the differential data row dPw(i). The δPw(i) is referred to as a two-step differential.

$$\delta Pw(i)=dPw(i)-dPw(i-1) \quad (21)$$

In Step S24 it is determined whether each data of the two-step differential data row δPw(i) belong to the section region larger than "$\pi$". When it is determined that each data of the two-step differential data row δPw(i) belong to the section region larger than "$\pi$", the procedure goes to step S25 to decrement the cumulative coefficient k(i) by 1 (k(i)=k(i-1)-1), and then goes to Step S28.

When the determination in Step S24 turns out to be negative, the procedure goes to Step S26 where it is determined whether each data of the two-step differential data row δPw(i) belong to the section region smaller than "$-\pi$". When it is determined that each data in the two-step differential data row δPw(i) belong to the section region smaller than "$-\pi$", the procedure goes to Step S27 where the cumulative coefficient k(i) is incremented by 1 (k(i)=k(i-1)+1) and goes to Step S28.

When each data of the two-step differential data row δPw(i) belong to the section region of not less than "$-\pi$" and not more than "$\pi$", the procedure goes to Step S28 while keeping the cumulative coefficient k(i) at the value of k(i-1).

It should be noted that the two-step differential data row δPw(i) is set in the range of $-2\pi<\delta Pw(i)<2\pi$.

In Step S28 the value obtained by adding $2\pi \times k(i)$ to the two-step differential data row δPw(i) which is the current process target is made the reconstructed differential data row dPu(i):

$$dPu(i)=\delta Pw(i)+2\pi \times k(i) \quad (22)$$

In Step S29 in order to process the next process target, the variable i is incremented. In Step S30 it is determined whether the value of the variable i after the increment has reached N or not, that is, whether there is a process target left or not. When it is left, the procedure goes back to Step S23 to apply the same process to the next target. When the process is done for all the differential data rows Pw(i), the procedure goes to Step S31 to acquire the reconstructed differential data row dPu(i) in the end. FIG. 3D shows the phase signal waveform Sdu having the differential corresponding to the reconstructed differential data row dPu(i). The phase signal waveform Sdu corresponds to the result of differentiation of the phase signal waveform Su' to be reconstructed shown in FIG. 3A.

Figure 1:
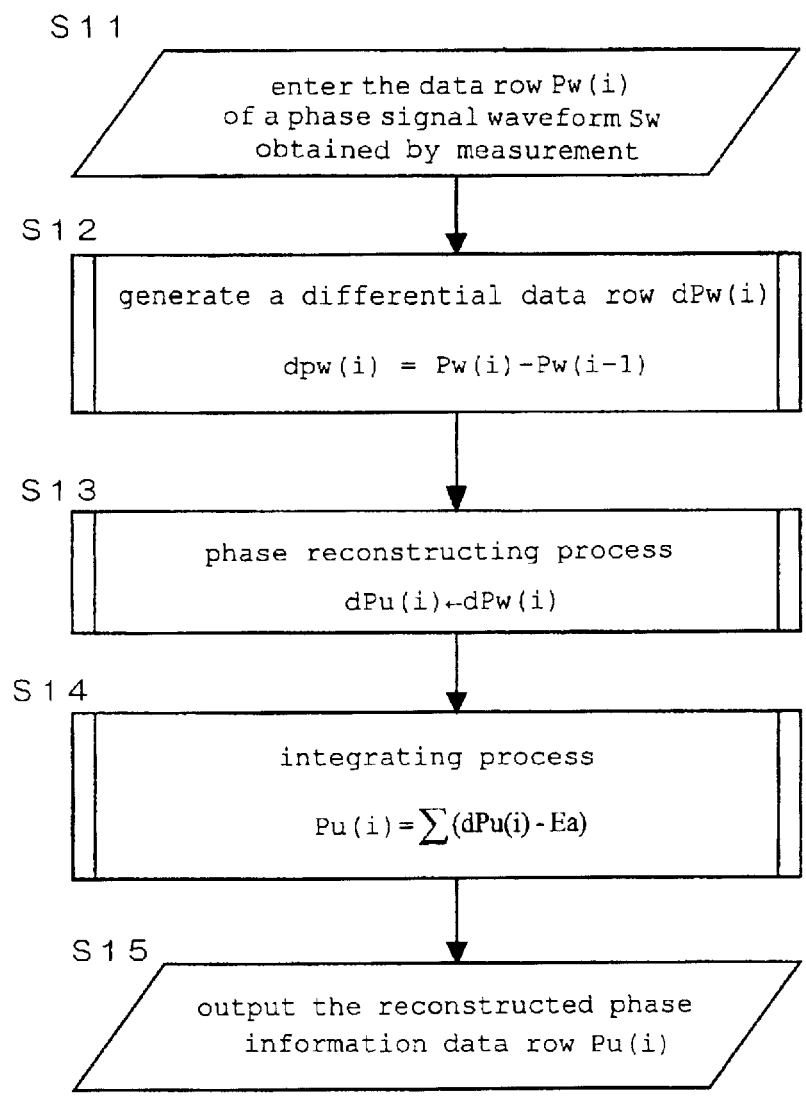
FIG. 1 is a flowchart depicting the procedure of the method for reproducing phase information signals in the information recording devices of Embodiments 1 and 2 of the present invention.

After Step S31 shown in FIG. 2, the procedure proceeds to Step S14 shown in FIG. 1. In Step S14, an integrating process is applied to the reconstructed differential data row dPu(i). The integrating process is the integration of data from which the mean value has been subtracted. To be more specific, supposing the mean value of the reconstructed differential data row dPu(i) is Ea, the differential (dPu(i)-Ea) is integrated with respect to the variable i, thereby obtaining the data row Pu(i) of the results of integration.

$$Pu(i)=\Sigma(dPu(i)-Ea) \quad (23)$$

FIG. 3E shows the phase signal waveform Su corresponding to the data row Pu(i) of the results of integration.

In the aforementioned description, the phase signal waveform Sdu of the differential shown in FIG. 3D is the differential waveform of the phase signal waveform Su' to be reconstructed shown in FIG. 3A. The integrated phase signal waveform Su shown in FIG. 3E is closely analogous to the phase signal waveform Su' to be reconstructed. The phase signal waveform Su' indicates the original track location.

As described hereinbefore, according to the method for reproducing phase information signals in the information recording device of the first embodiment of the present invention, the phase signal waveform Su' indicating the original track location can be accurately reconstructed from the phase signal waveform Sw measured in a convoluted state, even if the phase patterns on the information recording medium have a large amount of decentering. This enables the relation between the amount of decentering and the phase to be properly detected, and the tracking control of the head to be performed with high precision after compensating for the decentering by using the relation.

(Embodiment 2)

In the first embodiment, reconstructing precision is remarkably improved as compared with the method shown in FIG. 13. However, it has found out that the reconstructed phase signal waveform Su has singularities at a few points. Therefore, the second embodiment of the present invention aims at further improvement in reconstructing precision. The second embodiment will be described by using the flowchart of FIG. 1 and also the flowchart of FIG. 8 in place of that of FIG. 2.

Figure 8:
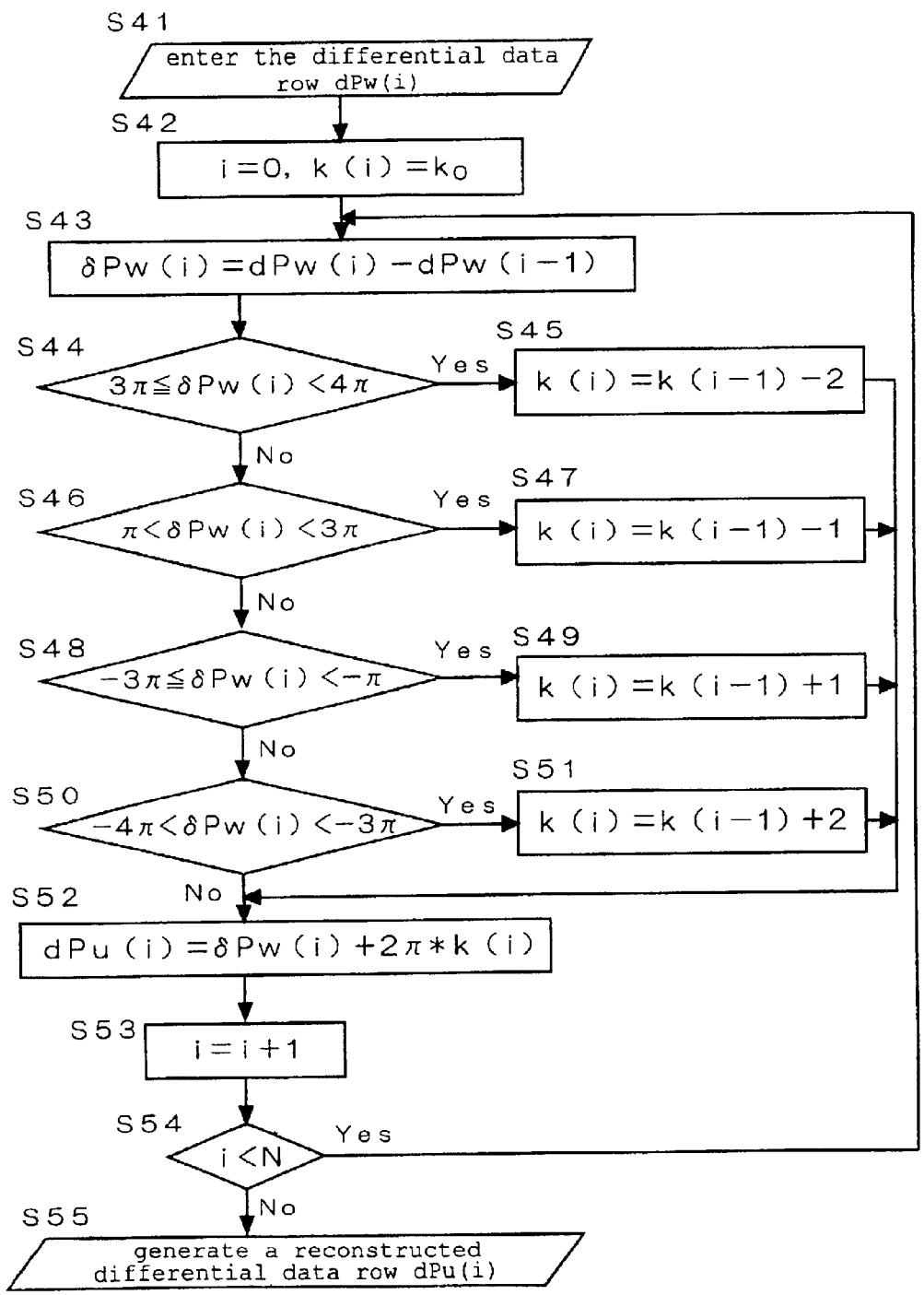
FIG. 8 is a flowchart depicting detailed procedure of the phase reconstructing process in Embodiment 2 of the present invention.

The following is a description of the method for reproducing phase information signals in the information recording device of the second embodiment, based on the flowchart of FIG. 8. In the process shown in FIG. 8 the two-step differential data row δPw(i) is divided into smaller section regions than in the process shown in FIG. 2.

Steps S41 to S43 are the same as Steps S21 to S23 shown in FIG. 2.

In Step 44 it is determined whether each data of the two-step differential data row δPw(i) belong to the section region larger than "3π". When it is determined that each data of the two-step differential data row δPw(i) belong to the section region larger than "3π", the procedure goes to step S45 to decrement the cumulative coefficient k(i) by 2 (k(i)=k(i−1)−2), and then goes to Step S52.

In Step 46 it is determined whether each data of the two-step differential data row δPw(i) belong to the section region of between "π" and "3π" exclusive. When each data belong to the section region, the procedure goes to step S47 to decrement the cumulative coefficient k(i) by 1 (k(i)=k(i−1)−1), and then goes to Step S52.

In Step 48 it is determined whether each data of the two-step differential data row δPw(i) belong to the section region of not less than "−3π" and less than "−π". When each data belong to the section region, the procedure goes to step S49 to increment the cumulative coefficient k(i) by 1 (k(i)=k(i−1)+1), and then goes to Step S52.

In Step 50 it is determined whether each data of the two-step differential data row δPw(i) belong to the section region of less than "−3π". When each data belong to the section region, the procedure goes to step S51 to increment the cumulative coefficient k(i) by 2 (k(i)=k(i−1)+2), and then goes to Step S52.

When each data of the two-step differential data row δPw(i) belong to the section region of not less than "−π" nor more than "π", the procedure goes to Step S52 while keeping the cumulative coefficient k(i) at the value of k(i−1).

The two-step differential data row δPw(i) is in the principle range of $-4\pi < \delta Pw(i) < 4\pi$.

Steps S52 to S55 are the same as Steps S28 to S31 of FIG. 2. After Step S55, the procedure proceeds to the integrating process of Step S14 shown in FIG. 1.

The comparison between the method in FIG. 13 and the method of the second embodiment for performing the process of FIG. 8 was simulated. For example, when the wedge number N=50, in the method of FIG. 13, the phase signal waveform Su' to be reconstructed was well reconstructed up to the amplitude of 25 rad; however, the reconstructed phase signal waveform Su fluctuated at 26 rad. In contrast, in the second embodiment, the phase signal waveform Su' to be reconstructed was well reconstructed up to the amplitude of 199 rad.

In general, the amplitude capable of being reconstructed is in proportion to the wedge number N in the method of FIG. 13 and to $N^2$ in the method of the present embodiment.

For example, when the wedge number N=100, in the method of FIG. 13, the phase signal waveform Su' to be reconstructed was well reconstructed up to the amplitude of 50 rad; however, the reconstructed phase signal waveform Su fluctuated at 51 rad. In contrast, in the second embodiment, the phase signal waveform Su' to be reconstructed was well reconstructed up to the amplitude of 796 rad.

According to the method of the second embodiment of the present invention, the phase signal waveform Su' indicating the original track location can be reconstructed with high precision from the phase signal waveform Sw measured in a convoluted state, without causing singularities even if the phase patters have a further larger amount of decentering in contrast to the track density.

In these embodiments, an integrating process is the integration of the data from which the mean value has been subtracted; however, besides this, there are other approaches available such as numerical integration with the use of Simpson's rule or the estimation of a reconstructed differential phase signal waveform as approximate function so as to find a logical integral function from the parameter.

As described hereinbefore, according to the present invention, in the information recording device utilizing phase servo control, a two-step differential data row is used to distinguish section regions, the cumulative coefficient is found to reconstruct the differential data row, and integration is performed to reconstruct the phase information data row. Therefore, the phase signal waveform indicating the original track location can be reconstructed accurately from the phase signal waveform measured in a convoluted state, even if the phase patters on the information recording medium have a large amount of decentering.

Using this result can detect the relation between the amount of decentering and the phase precisely. Hence, high precision tracking can be achieved by performing the tracking control of the head while compensating the decentering with the relation.

While there has been described what is at present considered to be preferred embodiments of this invention, it will be understood that various modifications may be made therein, and it is intended to cover in the appended claims all such modifications as fall within the true sprit and scope of the invention.

What is claimed is:

1. A method for reproducing phase information signals in an information recording device comprising:

a first step of acquiring a data row of phase information by making a head read phase patterns previously recorded as repetitive patterns in the direction of the radius of an information recording medium;

a second step of generating a differential data row consisting of a data row of differential values between adjacent data in said data row of the phase information read by the head;

a third step of generating a two-step differential data row consisting of a data row of differential values between adjacent data in said differential data row;

a fourth step of generating a differential data row reconstructed by a reconstructing process for solving the convolution process, after a cumulative coefficient is calculated according to the section region to which each data in said two-step differential data row belong; and a fifth step of acquiring a phase information data row reconstructed by applying an integrating process to said reconstructed differential data row.

2. The method for reproducing phase information signals in the information recording device of claim 1,
   wherein the data row of said phase information in the first step is a convoluted data row consisting of the remainders obtained by dividing each data in a phase information data row to be reconstructed by $2\pi$.

3. The method for reproducing phase information signals in the information recording device of claim 2,
   wherein in the fourth step, boundary values of said section regions are set at "−π" and "π".

4. The method for reproducing phase information signals in the information recording device of claim 2,
   wherein in the fourth step, boundary values of said section regions are set at "−3π", "−π", "π" and "3π".

5. The method for reproducing phase information signals in the information recording device of claim 1,
   wherein said integrating process involves generating a data row by subtracting the mean value of the reconstructed phase information data row from each data in the reconstructed phase information data row, and applying numerical integration to the generated data row.

* * * * *